(12) United States Patent
Brocato et al.

(10) Patent No.: US 11,783,002 B2
(45) Date of Patent: Oct. 10, 2023

(54) INTELLIGENT DYNAMIC PRELOADING

(71) Applicant: EDGIO, INC., Phoenix, AZ (US)

(72) Inventors: Mark Vincent Brocato, Tallinn (EE); Ivan Erceg, Los Condes (CL); Kaarel Kelk, Tallinn (EE); Ishan Anand, Sammamish, WA (US)

(73) Assignee: Edgio, Inc., Phoenix, AZ (US)

( * ) Notice: Subject to any disclaimer, the term of this patent is extended or adjusted under 35 U.S.C. 154(b) by 92 days.

(21) Appl. No.: 17/481,702

(22) Filed: Sep. 22, 2021

(65) Prior Publication Data
US 2022/0092144 A1    Mar. 24, 2022

Related U.S. Application Data

(60) Provisional application No. 63/081,809, filed on Sep. 22, 2020.

(51) Int. Cl.
*G06F 16/957* (2019.01)
*H04L 67/02* (2022.01)

(52) U.S. Cl.
CPC ......... *G06F 16/9574* (2019.01); *H04L 67/02* (2013.01)

(58) Field of Classification Search
None
See application file for complete search history.

(56) References Cited

U.S. PATENT DOCUMENTS

| | | | |
|---|---|---|---|
| 7,343,397 B2* | 3/2008 | Kochanski | G06Q 30/06 709/218 |
| 2001/0037400 A1* | 11/2001 | Raz | H04L 65/612 707/E17.12 |
| 2018/0234453 A1* | 8/2018 | Le | H04L 63/10 |
| 2021/0311728 A1* | 10/2021 | Raiskin | G06F 40/143 |
| 2022/0222689 A1* | 7/2022 | Chatterjee | G06Q 10/109 |
| 2022/0286753 A1* | 9/2022 | Mulford | H04N 21/26216 |

* cited by examiner

*Primary Examiner* — Quang N Nguyen
(74) *Attorney, Agent, or Firm* — GREENBERG TRAURIG, LLP; Andrew J. Tibbetts

(57) ABSTRACT

Intelligent dynamic preloading is described. A list of page requests is generated using a prediction model that predicts a plurality of page requests for a site or web application that are expected to be received from client devices, where at least some of the page requests include URLs and one or more other parameters that affect generation of a corresponding page. A request is simulated for each of the page requests included on the list of page requests to a caching layer to cause the caching layer to: make a request to an origin server for the site or dynamic web application, receive rendered pages from the origin server, and store the received rendered pages, such that subsequent requests received at the caching layer can be served from the already rendered pages.

20 Claims, 9 Drawing Sheets

```
210 ⎯⎯⎯
     { url: "https://www.site.com/example.html",
         headers: [ { 'cookie': 'lang=en' }]
     },
220 ⎯⎯⎯
     { url: "https://www.site.com/example.html",
         headers: [ { 'cookie': 'lang=es' }]
     },
230 ⎯⎯⎯
     { url: "https://www.site.com/example.html?param1=foo",
         headers: [ { 'cookie': 'lang=en' }]
     }
```

FIG. 2

```
     .preloadExplicitModel(async () => [{
310 ⎯⎯⎯ path: '/p/1' // page at /p/1
     }], [{
320 ⎯⎯⎯ path: '/p/2' // page at /p/1 when the English
     language cookie is present
         headers: { 'cookie': 'lang=en' }
     }],[{
330 ⎯⎯⎯ path: '/p/2' // page at /p/2 when the German
     language cookie is present headers: { 'cookie': 'lang=de' }
     }])
```

FIG. 3

```
.preloadStatisticalModel({
    limit: 100,
})
```

FIG. 4

```
// xdn.config.js
module.exports = {
  preloadConcurrency: 10 // preload URLs in
batches of 10 to not overwhelm the origin APIs
}
```

FIG. 5

INTELLIGENT DYNAMIC PRELOADING

RELATED APPLICATIONS

This application claims priority under 35 U.S.C. § 119(e) to U.S. Provisional Application No. 63/081,809 entitled "INTELLIGENT DYNAMIC PRELOADING," filed on Sep. 22, 2020, which is incorporated herein by reference in its entirety.

FIELD

Embodiments of the invention relate to the field of networking; and more specifically, to intelligent dynamic preloading.

BACKGROUND

A device may access content of a website by transmitting a request for a webpage of the website to a content delivery network (CDN) associated with the website. For example, an Internet browser application of the device may generate an HTTPS request indicating the webpage requested by the device. The CDN may provide a rendering of the requested webpage. The rendering of the webpage may be interpreted by the Internet browser application to generates a display of the webpage on the device. For example, the Internet browser application may interpret HTML code in the rendering of the webpage to generate the display of the webpage on the device.

SUMMARY

Intelligent dynamic preloading is described. A list of page requests is generated using a prediction model that predicts a plurality of page requests for a site or web application that are expected to be received from client devices, where at least some of the page requests include URLs and one or more other parameters that affect generation of a corresponding page. A request is simulated for each of the page requests included on the list of page requests to a caching layer to cause the caching layer to: make a request to an origin server for the site or dynamic web application, receive rendered pages from the origin server, and store the received rendered pages, such that subsequent requests received at the caching layer can be served from the already rendered pages.

According to some embodiments, a method is provided. The method comprises: generating a list of page requests using a prediction model that predicts a plurality of page requests for a site or web application that are expected to be received from client devices for a site or dynamic web application, wherein at least some of the page requests include URLs and one or more other parameters that affect generation of a corresponding page; and simulating a request for each of the page requests included on the list of page requests to a caching layer to cause the caching layer to: make a request to an origin server for the site or dynamic web application, receive rendered pages from the origin server, and store the received rendered pages, such that subsequent requests received at the caching layer can be served from the already rendered pages.

According to some embodiments, a non-transitory machine-readable storage medium is provided. The non-transitory machine-readable storage medium provides instructions that, if executed by a processor, will cause the processor to carry out a method comprising: generating a list of page requests using a prediction model that predicts a plurality of page requests for a site or web application that are expected to be received from client devices for a site or dynamic web application, wherein at least some of the page requests include URLs and one or more other parameters that affect generation of a corresponding page; and simulating a request for each of the page requests included on the list of page requests to a caching layer to cause the caching layer to: make a request to an origin server for the site or dynamic web application, receive rendered pages from the origin server, and store the received rendered pages, such that subsequent requests received at the caching layer can be served from the already rendered pages.

According to some embodiments, an article of manufacture is provided. The article of manufacture comprises: a non-transitory machine-readable storage medium that provides instructions that, if executed by a machine, will cause the machine to carry out a method comprising: generating a list of page requests using a prediction model that predicts a plurality of page requests for a site or web application that are expected to be received from client devices for a site or dynamic web application, wherein at least some of the page requests include URLs and one or more other parameters that affect generation of a corresponding page; and simulating a request for each of the page requests included on the list of page requests to a caching layer to cause the caching layer to: make a request to an origin server for the site or dynamic web application, receive rendered pages from the origin server, and store the received rendered pages, such that subsequent requests received at the caching layer can be served from the already rendered pages.

According to some embodiments, a system for delivering content of one or more webpages from a host system to client devices is provided. The system configured to communicate with the client devices and the host system. The system comprises: at least one processor; and at least one computer-readable storage medium having encoded thereon: information about webpages provided by the host system; and instructions that, when executed by the at least one processor, cause the at least one processor to perform a method comprising: identifying, using the information about the webpages, a plurality of webpages, of the webpages provided by the host system, to be rendered by the host system; obtaining, from the host system, a rendering of each of the plurality of webpages; storing the rendering of each of the plurality of webpages in the at least one computer-readable storage medium; receiving, from a client device, a request to access a first webpage of the webpages; determining, using the information about the webpages, whether the first webpage identified in the request is included in the plurality of webpages for which renderings were obtained; and in response to determining that the first webpage is included in the plurality of webpages for which renderings were obtained, transmitting, to the client device, a rendering of the first webpage stored in the at least one computer-readable storage medium.

In some embodiments, the method further comprises triggering identifying of the plurality of webpages in response to a notification of a deployment of a website and/or web application on the host system. In some embodiments, the method further comprises triggering identifying of the plurality of webpages in response to updating of one or more of the webpages. In some embodiments, method further comprises triggering identifying of the plurality of webpages in response to removal of renderings of at least some webpages from the at least one storage medium. In some embodiments, the identifying, using the information about the webpages, the plurality of webpages to be rendered by the host system is not triggered by a request from the client device for a webpage of the plurality of webpages.

In some embodiments, the information about the webpages comprises information about one or more parameters that are used by the host system to render the webpages. In some embodiments, obtaining the rendering of each of the plurality of webpages comprises: determining values of the one or more parameters that, when used by the host system, cause the host system to render one of a plurality of versions of the webpage; and transmitting, to the host system, a request including the determined values of the one or more parameters.

In some embodiments, the request comprises a URL, a cookie, and/or a header; and transmitting the request including the determined values of the one or more parameters comprises including the determined values of the one or more parameters in the URL and/or the cookie. In some embodiments, obtaining the rendering of each of the plurality of webpages comprises: transmitting, to the host system, a request with a first set of values of the one or more parameters indicating first content to be rendered for a first webpage of the plurality of webpages; obtaining, from the host system, a rendering of the first webpage including the first content; transmitting, to the host system, a request with a second set of values of the one or more parameters indicating second content to be rendered for a second webpage of the plurality webpages; and obtaining, from the host system, a rendering of the second webpage including the second content.

In some embodiments, the method further comprises: receiving, from the client device, a request to access a second webpage of the webpages provided by the host system; in response to determining that the second webpage is not included in the plurality of webpages for which renderings were obtained, obtaining, from the host system, a rendering of the second webpage; and transmitting the rendering of the second webpage to the client device.

In some embodiments, identifying, using the information about the webpages, the plurality of webpages to be rendered by the host system comprises: determining most accessed webpages of the webpages provided by the host system; and identifying the most accessed webpages as among the plurality of webpages to be rendered. In some embodiments, the information about the webpages comprises access logs for the webpages; and identifying the plurality of webpages to be rendered by the host system comprises using the access logs to identify the plurality of webpages.

In some embodiments, identifying, using the information about the webpages, the plurality of webpages to be rendered by the host system comprises: determining least accessed webpages of the webpages; and identifying the least accessed webpages as among the plurality of webpages to be rendered. In some embodiments, identifying the plurality of webpages to be rendered by the host system comprises using a prediction model to identify the plurality of webpages. In some embodiments, the prediction model comprises a statistical model indicating a frequency of access of the webpages. In some embodiments, identifying the plurality of webpages to be rendered by the host system using the prediction model comprises determining that the prediction model indicates that the plurality of webpages are accessed more frequently than other ones of the webpages. In some embodiments, identifying the plurality of webpages to be rendered by the host system using the prediction model comprises determining that the prediction model indicates that the plurality of webpages are accessed less frequently than other ones of the webpages.

According to some embodiments, a computer-readable storage medium having encoded thereon information about webpages provided by the host system and instructions is provided. The instructions, when executed by at least one processor, cause the at least one processor to perform a method for delivering content of one or more webpages provided by a host system to client devices. The at least one processor is configured to communicate with the client devices and the host system. The method comprises: identifying, using the information about the webpages, a plurality of webpages, of the webpages provided by the host system, to be rendered by the host system; obtaining, from the host system, a rendering of each of the plurality of webpages; and storing the rendering of each of the plurality of webpages in the at least one computer-readable storage medium, wherein stored renderings allow the system to provide one or more of the plurality of webpages to a client device in response to a request without the host system performing rendering.

In some embodiments, the method further comprises triggering identifying of the plurality of webpages in response to a notification of a deployment of a website and/or web application on the host system.

According to some embodiments, a method for a system to deliver content of one or more webpages provided by a host system to client devices is provided. The system is configured to communicate with the client devices and the host system. The method comprises: identifying, using information about the webpages stored by the system, a plurality of webpages, of the webpages provided by the host system, to be rendered by the host system; obtaining, from the host system, a rendering of each of the plurality of webpages; and storing the rendering of each of the plurality of webpages in the at least one computer-readable storage medium, wherein stored renderings allow the system to provide one or more of the plurality of webpages to a client device in response to a request without the host system performing rendering.

BRIEF DESCRIPTION OF THE DRAWINGS

The invention may best be understood by referring to the following description and accompanying drawings that are used to illustrate embodiments of the invention. In the drawings:

FIG. 2 shows an example Manifest used for the intelligent dynamic preloading according to an embodiment.

FIG. 3 shows an example in code of an explicit list model according to an embodiment.

FIG. 4 shows an example in code of a specified size limit of the number of requests for intelligent dynamic preloading according to an embodiment.

FIG. 5 shows an example in code for specifying a concurrency limit of a preloader of the intelligent dynamic preloading according to an embodiment.

DESCRIPTION OF EMBODIMENTS

Figure 1A:
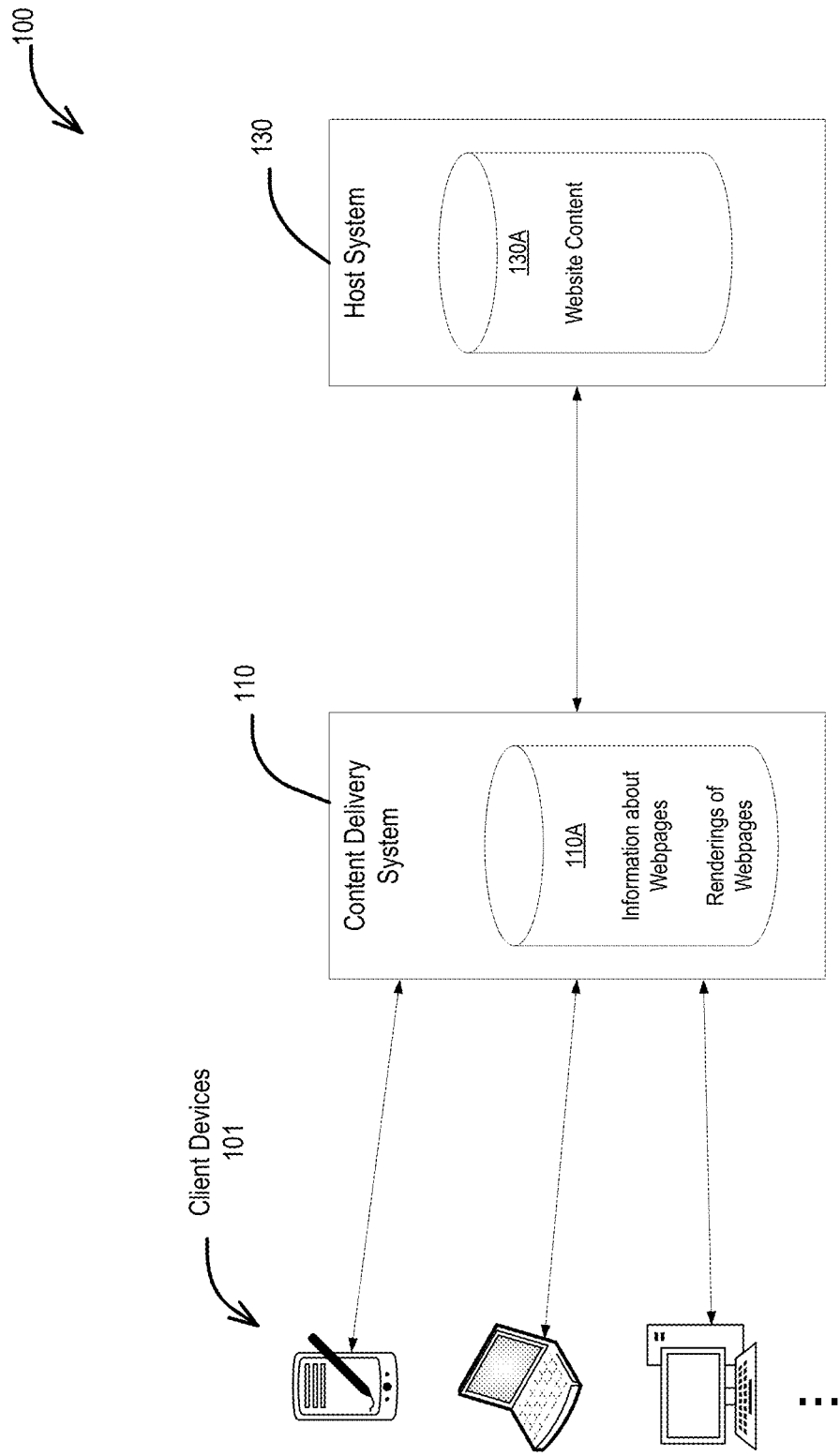
FIG. 1A shows an exemplary system in which some embodiments of the technology described herein may be implemented.

Described herein are embodiments of system for efficiently delivering content of webpages of a website to users. The system of these embodiments stores information about the webpages of the website. Periodically or occasionally, or otherwise upon satisfaction of a condition, the system uses that information about the webpages to identify multiple webpages, from among the webpages of the website, for which renderings are to be retrieved. The system then obtains renderings of the identified webpages from the website and stores the renderings of the webpages. The acts of identifying multiple webpages for which renderings are to be retrieved and obtaining renderings of the identified webpages may be performed separate from and/or in advance of receiving any specific request for one of the identified webpages from a client device. By doing so, the renderings of the multiple webpages that are identified may be retrieved and stored to more quickly respond to a request for one of the identified webpages. Upon receiving a request from a user to access a webpage of the website, the system determines whether the webpage is one for which the system has previously stored a rendering. If so, the system transmits the stored rendering of the webpage to the user instead of obtaining a rendering of the webpage from the website after receiving the request.

With this prerendering technique, rendering that would otherwise be needed to respond to a request may be avoided for at least some webpages of a website. By avoiding such rendering during the handling of a request, the speed of responding to the request may be increased (e.g., by an amount of time corresponding to a rendering time). By obtaining renderings of an identified subset webpages of a website, the system reduces the average time needed to respond to requests to access webpages of the website without requiring all webpages of the website to be rendered ahead of time. For example, the identified subset of webpages may be webpages that are determined to be the most frequently accessed webpages of the website and, by obtaining renderings of the identified subset of webpages, the system may increase the speed of responding to requests for those webpages.

The system of some embodiments may be implemented in a caching system that is separate from a host system that hosts the website and that is the source for content of webpages of the website. Without the caching system, client devices may obtain content of the webpages from the host system. The caching layer may serve to increase speed of serving requests from client devices, by storing renderings of webpages in its own data store(s) and responding to requests from client devices with the renderings from those data store(s), rather than retrieving the renderings from the host system. The caching system may be, in some embodiments, a content delivery network (CDN), and may be implemented as a group of computing devices (e.g., servers and/or data centers) placed in different geographic locations that store content (e.g., renderings of webpages) obtained from a host system, and deliver the content to client devices.

A webpage may appear when displayed in a web browser to be a single unified set of content, but may not necessarily be stored that way by a host system. In some cases, rather than storing a unified set of content for each webpage of the website, a host system may store the web page as multiple disparate parts (e.g., header, footer, sidebar, and/or various components of main content, such as text vs. images or different portions of text). The host system may retrieve the different parts of the content for the webpage from one or multiple databases or other data stores, and may base the retrieval (e.g., identification of content to be retrieved) on one or more parameters included in a request from a client device. The host system may then render a webpage before transmitting it from the host system, by retrieving the content for the different parts of the webpage and assembling the different parts to obtain a rendering of the webpage. When the host system uses a parameter included in the request to determine content in the webpage, the parameter may affect the webpage content in a variety of ways. For example, a language parameter in a request may indicate a language (e.g., English, Spanish, German, Arabic, etc.) in which to display textual content of the webpage. In this example, the system may use the language parameter to retrieve textual content of the language indicated by the language parameter to include in a rendering of a webpage. Other content of webpages may also be varied based on parameters.

Typically, such webpages of a website are either rendered by the host system individually on-demand (e.g., the server renders HTML of a requested webpage only when a request for that webpage or application program interface (API) is received from a client device), or statically rendered all at once ahead of time in a comprehensive build step (e.g., all the website's pages are generated before the site or web application is deployed, a technique that has been recently referred to as "JAMSTACK").

On-demand rendering incurs a web performance penalty while the user waits for the server to generate the response. However, it gives development teams greater agility since they do not have to wait for a lengthy build step to complete when developing, updating, and deploying a website. Conversely, static rendering can return responses faster to the user since the server does not have to render the webpage when it is requested. The tradeoff for static rendering is that the development team (or even back office content team) must wait for the build step to complete anytime there is a change to the website (e.g., a change in the application or data that is used to build the webpages of the website). Because the time spent waiting for the build step is generally proportional to the number of pages on the site, the build step can take a prohibitively long time (minutes to hours) for a large site with many pages. For example, some websites may have thousands or millions of webpages, which may include a large number of variations of a smaller number of webpages, where the variations may be driven by parameters included in requests (e.g., multiple different language versions of one underlying webpage, and the like). Statically rendering all the webpages may add a large computational burden on a host system to render all the webpages for each change in the website.

JavaScript heavy static sites, such as single page applications (SPAs), use a technique called prerendering which we will refer to as "SEO prerendering" herein. SEO prerendering works by using a headless browser (e.g., Chrome Puppeteer) to execute each page's JavaScript so that the content on the page can be parsed by bots (in contrast to real users) such as search engines and crawlers and the objective is to improve search engine ranking (in contrast to the load time or performance of the page).

The inventors have recognized that if a caching system had access to information about a website and/or webpages of the website, the system may be able to leverage that information to identify multiple webpages that, if rendered and cached prior to receiving requests for the webpages, would increase the overall efficiency of the system in delivering content of the website. Accordingly, the inventors have developed techniques of intelligent dynamic preloading described herein. Some embodiments described herein improve the speed of providing webpages from a website in response to client requests by using information about the website and/or webpages of the website to identify multiple webpages of the website (e.g., the most frequently accessed webpages or other webpages) to render before receiving requests to access the webpages. The system may further use the information to identify parameters in requests that would result in variations in renderings of the webpages (e.g., different language, header, color theme, etc.). The system may then obtain and store renderings of the identified multiple webpages and/or variations thereof. Later, when a request to access one of the identified webpages is received from a client device, the system may respond by providing a previously obtained rendering, thereby eliminating the time that would have been spent in rendering the webpage.

In some embodiments, a prediction model is used to generate a list of page requests (referred herein as a manifest) that are expected to be received from client devices for a website or dynamic web application. The page requests may include URLs and associated request headers, cookies, and/or other parameters that affect the generation of the associated page. For instance, if the page would be rendered differently if a language cookie is set to "English" than when it is set to "Spanish," there may be effectively two page requests for the same URL; one specifying the cookie "English" and the other specifying the cookie "Spanish." In some embodiments, requests that correspond to the page requests are simulated (not coming from a client device of a user of the website or dynamic web application) through a caching layer effectively causing the caching layer to make those requests to a host system. The host system in turn renders the appropriate pages (which may include accessing one or more databases) based on the page requests and returns them to the caching layer where they are then saved and associated with a cache key. Thereafter, upon a request being received at the caching layer that matches the cache key, the already rendered page can be served directly from the caching layer instead of the request being forwarded to the host system. Thus, dynamically generated pages can be served from the caching layer which improves loading time for the client devices and decreases bandwidth use for the host system without delaying deployment of the site for a build step that static site generation employs.

Unlike a statically generated site, in some embodiments the website is deployed to handle live traffic without waiting for a build step. This allows for the site or web application to be deployed more quickly. If a request arrives from a client device that is not in the manifest and/or not yet been rendered, the request is processed by the server as in its typical way. If, however, a request is received from a client device for a page that has been already rendered, then that previously rendered page can be served from the cache thereby providing similar performance as a statically rendered site or web application. Embodiments described herein efficiently balance the benefits of static rendering with the agility of the on-demand approach for web applications that have many pages.

FIG. 1A shows an example system in which some embodiments of the technology may be implemented. The system includes client devices 101, a content delivery system 110, and a host system 130.

The host system 130 may include one or more computing devices (e.g., server(s) and datastore(s)) that store content of a website. The host system 130 may be configured to use the content to render webpages of the website that can be provided to client devices (e.g., for display by an Internet browser application). As shown in the example of FIG. 1A, the host system 130 includes a datastore 130A storing content for a website. The datastore 110A may comprise data storage hardware. For example, the data storage hardware may include one or more solid state drives (SSDs), hard disk drives (HDDs), and/or other types of storage hardware. The content of the website may include webpage code (e.g., HTML, CSS, and/or JAVASCRIPT code), web applications, data, metadata, and/or application program interfaces (APIs). The host system 130 may be configured to render webpages of the website using the website content stored in the datastore 130A. For example, the host system 130 The host system 130 may be configured to render a webpage by compiling data, webpage code, web application(s), and/or API(s) to generate the webpage. For example, the host system 130 may render a webpage by inputting data into webpage code (e.g., HTML, CSS, and/or JAVASCRIPT) to generate a webpage file that can be interpreted by an Internet browser application. In another example, the host system 130 may render a webpage by compiling a web application that can be executed by an Internet browser application. The host system 130 may be configured to perform rendering of a webpage in response to a request from the content delivery system 110 and/or another source.

Each of the client devices 101 may be any suitable computing device. For example, a client device may be a mobile device (e.g., a smart phone, tablet, or laptop), a desktop computer, or other computing device. The client devices 101 may request content of webpages of the website from the content delivery system 110. For example, a client device may use an Internet browser application to transmit a request for one or more webpages of a website, which is received and processed by the content delivery system 110.

The content delivery system 110 may be a set of one or more computing devices (e.g., servers and/or data centers) that obtain content from the host system 130, and provide content to the client devices 101 (e.g., in response to request from the client devices). Although in FIG. 1A the content delivery system 110 is illustrated as a single entity, in some embodiments, the content delivery system 110 may comprise of multiple computing devices (e.g., servers and/or data centers) that are geographically distributed. In some embodiments, the content delivery system 110 may be implemented as a content delivery network (CDN). For example, a first server of the CDN may be in North America, a second server of the CDN may be in South America, and a third server of the CDN may be in Europe. In this example, each of the servers may serve client devices in its respective geographic region (e.g., by providing rendered webpages to client devices in the respective geographic region).

The content delivery system 110 may be configured to provide a rendering of a webpage to a client device in response to a request from the client device to access the webpage. As shown in FIG. 1A, the content delivery system 110 includes a datastore 110A. The datastore 110A stores information about webpages of the website. In some embodiments, the information about the webpages of the website may include information about one or more parameters that are used to render webpages. The parameter(s) may impact content in webpages of the website. For example, the parameter(s) may indicate language, format, visual theme, data, an API, customization, design, and/or other content in the webpages of the website. In some embodiments, the parameter(s) may indicate variations in renderings of a webpage by indicating which information is to be included in a rendering of a webpage. For example, the parameter(s) may indicate language for textual information in a rendering of the webpage. For example, the datastore 110A may store information about URL, cookie, and/or header parameters that are used by the host system 130 to versions of webpages of the website. In some embodiments, the information about the webpages of the website may include access logs for the website. The access logs may store a history of user access to webpages of the website. The datastore 110A further stores renderings of webpages obtained from the host system 130.

The datastore 110A may comprise data storage hardware. For example, the data storage hardware may include one or more solid state drives (SSDs), hard disk drives (HDDs), and/or other types of storage hardware.

In some embodiments, the content delivery system 110 may be configured to identify, using the information about webpages of the website, webpages of the website that are to be rendered by the host system. Example techniques for identifying the webpages are described herein. The content delivery system 110 may be configured to obtain renderings (e.g., webpage files) of the webpages. The content delivery system 110 may be configured to store the obtained renderings. The content delivery system 110 may be configured to identify the webpages and obtain renderings thereof prior to receiving a request from a client device to access any of the identified webpages. Later, when the content delivery system 110 receives a request, from a client device, to access a webpage of the website, the content delivery system 110 may determine whether a webpage requested by a client device is one for which a rendering was previously obtained. In response to determining that the content delivery system 110 has a rendering of a requested webpage stored, the content delivery system 110 may transmit the stored rendering of the requested webpage to the client device. When the content delivery system 110 determines that the requested webpage is one for which a rendering was not previously obtained, the content delivery system 110 may obtain, from the host system 130, a rendering of the webpage, and transmit the rendering of the webpage to the client device.

The content delivery system 110 may be configured to use different techniques to identify multiple webpages of a website for which to obtain renderings prior to and/or independent from receiving client requests for the webpages. In some embodiments, the content delivery system 110 may be configured to identify the multiple webpages by: (1) determining, using the information about the webpages of the website, the most accessed webpages of the website; and (2) identifying the most accessed webpages as among the webpages for which to obtain renderings. In some embodiments, the content delivery system 110 may be configured to identify the webpages by: (1) determining, using the information about the webpages of the website, the least accessed webpages of the website; and (2) identifying the least accessed webpages as among the webpages for which to obtain renderings. In some embodiments, the content delivery system 110 may be configured to identify the multiple pages of the website for which to obtain renderings using a prediction model. For example, the prediction model may be a statistical model indicating a frequency of access of webpages of the website. In one example, the content delivery system 110 may identify the multiple webpages for which to obtain renderings as webpages that the statistical model indicates are accessed more frequently than other webpages. In another example, the content delivery system 110 may identify the multiple webpages for which to obtain renderings as webpages that the statistical model indicates are accessed less frequently than other webpages.

In some embodiments, the content delivery system 110 may be configured to perform the identification of the multiple webpages, from among the webpages of the website, for which renderings are to be obtained, in response to one or more triggers. In some embodiments, the content delivery system 110 may be configured to trigger identifying of the webpages in response to the content delivery system 110 receiving a notification of a deployment of the website. For example, the content delivery system 110 may trigger identifying of the webpages in response to a message from the host system 130 indicating that a new deployment of the website is available, which may correspond to an update of at least some content of the website. An update to a webpage may include a change in data of the webpage, a change in an API included in the webpage, a change in webpage code (e.g., HTML, CSS, and/or JAVASCRIPT code), web applications, data, metadata, application program interfaces (APIs), and/or other content of the webpage. In some embodiments, the content delivery system 110 may be configured to trigger identifying of the webpages in response to removal of previously stored renderings from the datastore 110A.

The content delivery system 110 may be configured to obtain renderings of each of the identified webpages from the host system 130. In some embodiments, the content delivery system 110 may be configured to obtain a rendering of a webpage by: (1) determining values of one or parameters used by the host system to render the webpage (e.g., a version of the webpage indicated by values of the parameter(s)); and (2) transmit, to the host system, a request including the determined values of the parameter(s). In some embodiments, the request may comprise a URL, header, and/or cookie including the parameters that are used by the host system to render the webpage. Renderings of webpages may be parameterized by a combination of URL, headers, and cookies. Example headers include a user-agent header identifying information about a client device (e.g., whether the device is a mobile or desktop device, an operating system of the device, an Internet browser application being used by the device, and/or other information), a referrer header identifying an entity (e.g., another website) that referred a client device to a webpage, a language header indicating a desired language for a webpage, an authorization header including credentials for user authentication, and/or other headers. In some embodiments, the content delivery system 110 may be configured to obtain renderings of different versions of a webpage. The content delivery system 110 may be configured to transmit to the host system 130: (1) a first request including a first set of parameter values indicating first content for a first version of the webpage; and (2) a second request including a second set of parameter values indicating second content for a second version of the webpage. The content delivery system 110 may be configured to obtain renderings of a first version of the webpage and a second version of the webpage from the host system 130.

Figure 1B:
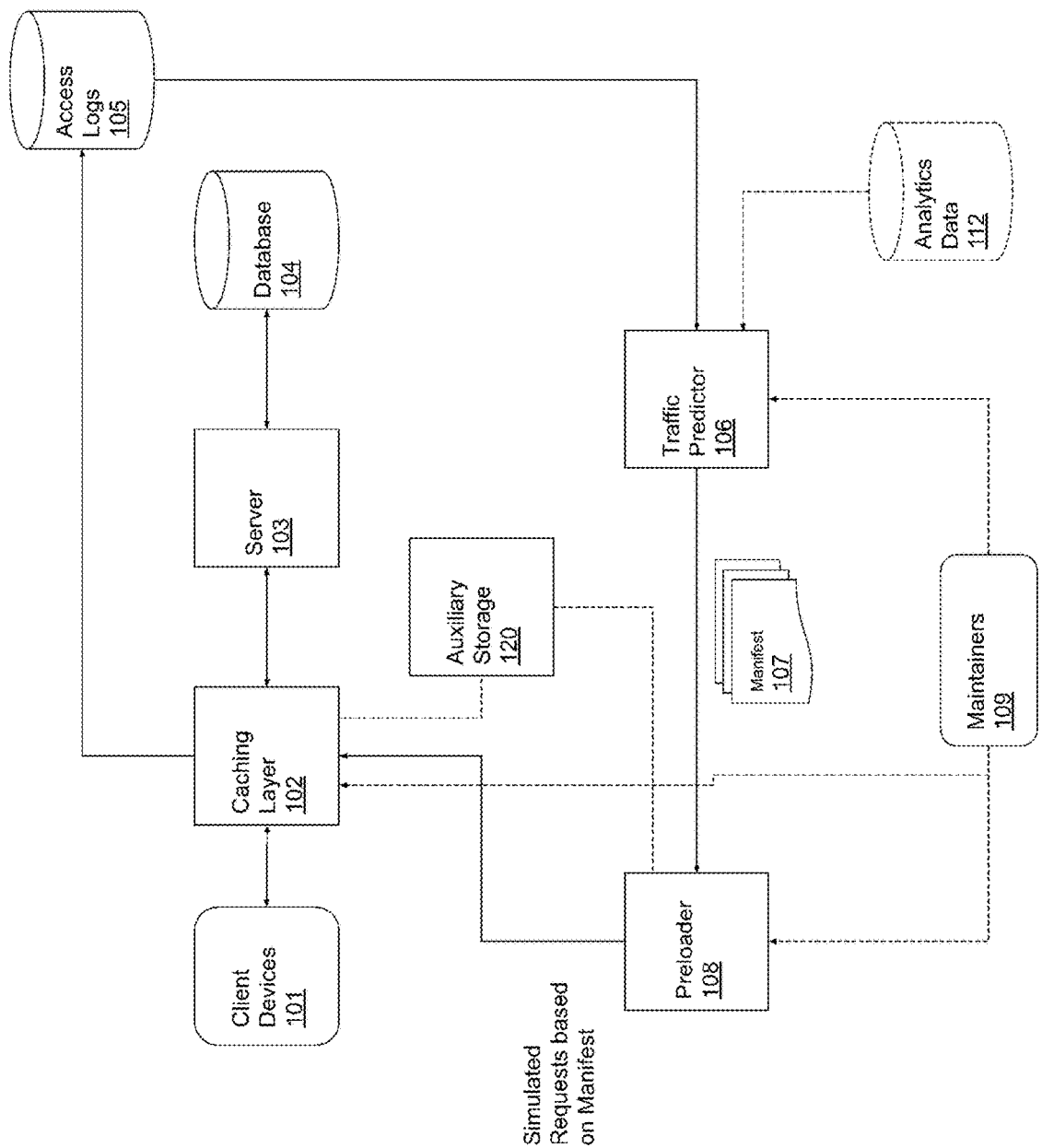
FIG. 1B shows an exemplary architecture for intelligent dynamic preloading according to an embodiment.

An exemplary architecture for intelligent dynamic preloading for websites or dynamic web applications is shown in FIG. 1B. In the example of FIG. 1B, the server 103 and database 104 may be components of the host system 130 of FIG. 1A, and the caching layer 102, access logs 105, traffic predictor 106, preloader 108, maintainers 109, analytics data 112, and auxiliary storage may be components of the content delivery system 110 of FIG. 1A. Client Devices 101 access a website or web application hosted on Server 103 and data in database 104. For example, in the case of an ecommerce site, Server 103 would represent the ecommerce logic and database 104 would the data about the products, categories, promotions, users, etc. Note that Server 103 could represent a single server, a cluster of servers (e.g., Kubernetes cluster), or serverless host (e.g., AWS Lambda).

The Caching Layer 102, which could be an additional server or application (e.g., Varnish) or network of servers (e.g., a CDN), sits in front of the Server 103 and intercepts requests and responses. Caching Layer 102 comprises web server functionality that handles HTTP requests from Client Devices 101, examines those requests, forwards some of the requests to Server 103, receives responses from Server 103, stores some of those responses in a storage component, and either serves previously stored responses to Client Devices or relays the responses from Server 103 to the Client Devices 101. When a response has been marked by the Server 103 as "cacheable" (through a mechanism such as an HTTP header returned by the Server 103, via direct configuration of cacheable responses, e.g., a VCL configuration file, and/or a GUI that lets developers list the URLs that are cacheable that is received at the Server 103 or Caching Layer 102), then Caching Layer 102 will save the response. If subsequently another request comes through matching the same cache key, Caching Layer 102 will return the result directly to Client Devices 101 from its saved response rather than forwarding it to Server 103 (thereby saving time, especially if Server 103 takes a while to render the page and query Database 104).

In addition, Caching Layer 102 also records information about each request and response that it serves, and this history is recorded in the Access Logs 105. Access Logs 105 includes access log information about the request and response (status code, headers, etc.). Access Logs 105 may also store additional components of cache key that are used by Caching Layer 102 to determine the cache hit/miss and cacheability status of the request. For example, if the site has different content for users when a "language" cookie is set to "English" than when it is set to "Spanish" then the language cookie will be part of the cache key and the value of this cookie may be recorded in the cache key.

In practice, caches such as Caching Layer 102 typically have storage limits after which older cached responses are removed to make space for newer cached responses. So, an additional data storage component Auxiliary Storage 120 may be present to augment the capacity of Caching Layer 102. Auxiliary Storage 120 represents a large capacity, long term data storage system such as files on disk or a redundant cloud file storage (e.g., AWS S3) that has significantly greater capacity requirements than a cache at the tradeoff of potentially slower data access times than the standard cache memory. In some embodiments, after the Preloader 108 has populated Caching Layer 102 with a request, it will also place the rendered page into Auxiliary Storage 120 and inform Caching Layer 102 to serve cache misses for that request to the Auxiliary Storage 120 instead of going to Server 103. While Auxiliary Storage 120 is slower than cache memory it is typically much faster than asking Server 103 to spend CPU cycles to render the page (especially if Auxiliary Storage 120 is on a nearby machine to Caching Layer 120). As a result, performance for these pages has been improved even when there is a cache miss in Caching Layer 102. Note that Caching Layer 102 may be configured to still send the request for a cache miss to Server 103 if it fails to find the data in Auxiliary Storage 120. Some embodiments may minimize latency when a cache miss occurs by having Caching Layer 102 forward the request to both Auxiliary Storage 120 and Server 103 simultaneously and using whichever response comes back first. Note that in some embodiments the system that implements Caching Layer 102 may have a form of large capacity data storage within it that makes Auxiliary Storage 120 redundant.

The information from the Access Logs 105 is analyzed by the Traffic Predictor 106. As will be discussed later herein, the Traffic Predictor 106 analyzes the traffic patterns in the Access Logs 105 and generates a prediction model for the site that is used to generate a sequence of requests that we refer to as Manifest 107. The Manifest 107 is a ranked list of page requests (which includes URLs, headers, cookies, etc.). The Manifest 107 is passed to the Preloader 108 which loads the page requests specified in the Manifest 107 to pull them into Caching Layer 102. Preloader 108 does this by issuing the requests specified in the Manifest 107 to Caching Layer 102. If Caching Layer 102 does not have the requested data in its cache, Caching Layer 102 forwards the request to Server 103. Assuming that the requested data is available to Server 103, it renders the response and transmits the rendered response to Caching Layer 102. Caching Layer 102 then stores the rendered response in its cache. Alternatively, the Preloader 108 may populate the Caching Layer 102 by sending requests from the Manifest 107 directly to Server 103 and then send the response explicitly to Caching Layer 102 to save in its storage for the given request and the corresponding cache keys. As described previously, Preloader 108 may send the response to Auxiliary Storage 120 and inform Caching Layer 102 that future cache misses for this request should be directed to Auxiliary Storage 120 in preference of Server 103.

Manifest 107 may contain more than merely the URLs for the page requests. As previously discussed, the components for the cache key may be stored in Access Logs 105 and those components may also be in Manifest 107. Consider the example from earlier where a site had different content for "English" and "Spanish" values of the "language" cookie. In this case, requests for pages in the Manifest where the language cookie is part of the cache key would have not only the page URLs but also the value of the cookie ("English" or "Spanish") that should be used by Preloader 108 when simulating the request. As an example, a section of Manifest 107 may look like FIG. 2. In this example the Manifest 107 is stored as a series of JSON formatted objects and FIG. 2 shows 3 of these entries for a site where the language cookie "lang" and query parameter "param1" are part of the cache key for different page requests. The first entry 210 is the request for the page "https://www.site.com/example.html" with an English language cookie value ("en"); the second entry 220 is for the same page with the Spanish language cookie value ("es"); the third entry 230 is for the same page as the first entry but this time with the value "foo" for query parameter "param1" that is a component of the cache key. The Server 103 will render a different page for each of these page requests.

The Preloader 108 may tag its requests with an authorization header so that Caching Layer 102 can distinguish it from regular traffic. This prevents traffic from Preloader 108 to: not be counted as normal traffic to the website (especially by Access Logs 105), be prioritized below serving normal traffic, and to be not flagged by site defense mechanisms in place to protect against large traffic attacks. In addition, in some models, such as the geographic model, the Preloader 108 needs to issue requests to specific servers in Caching Layer 102 in particular geographies. As a result, Preloader 108 may need to manually specify the IP address of the specific Caching Layer 102 server in each geography rather than relying on standard DNS resolution. In some embodiments, multiple Preloaders 108 may issue requests from multiple geographic locations respectively so that requests are routed to servers of the Caching Layer 102 that exist in those geographic locations.

While the Manifest 107 conceptually may be considered a single list, in some embodiments the Manifest 107 may be broken apart into smaller lists or streamed sequentially into Preloader 108 so that the Preloader 108 can begin the preloading process without waiting for the Traffic Predictor 106 to finish generating the complete Manifest 107. For example, suppose the Traffic Predictor 106 needs to crawl the site to generate the Manifest 107. Ordinarily this would mean that the preloading process cannot start until the Traffic Predictor 106 finishes crawling the site and builds the complete manifest. However, since in some embodiments the Traffic Predictor 106 can start streaming the requests one by one or in batches to the Preloader 108, the Preloader 108 can begin its work without waiting for the crawling process to finish.

The Preloader 108 and/or Server 103 may be running on a serverless provider. In such a case, the Server can scale up very rapidly and with little maintenance overhead when there is an increase in traffic. Similarly, this allows the Preloader 108 to scale and parallelize loading requests into the cache very rapidly and with little maintenance overhead when there is a Manifest 107 with very many requests. Alternatively, the Preloader 108 may run on the same host as the Caching Layer 102 or the Traffic Predictor 106. In an appropriate cluster architecture (e.g., such as Kubernetes) any of the computing software entities such as but not limited to the Caching Layer 102, Server 103, Database 104, Traffic Predictor 106, and Preloader 108 may run on the same machine or cluster of machines or each one on its down dedicated cluster.

Finally note the participation of the site's developers, authors, and managers whom we collectively refer to as Maintainers 109 that are in charge of maintaining and updating the site or application that is being served to the Client Devices.

The Traffic Predictor 106 analyzes the traffic patterns in the Access Logs 105 and generates a prediction model for the site and outputs the Manifest 107. The Traffic Predictor 106 can build the manifest in a variety of ways according to parameters specified by the developer or maintainers 109. In these examples we will describe how Maintainers 109 can specify these parameters in metadata embedded in their application code. However, without loss of generality, Maintainers 109 can specify these parameters in code or through a graphical user interface or through an API. In particular, triggering the Preloader and supplying the model parameters may be done automatically via an API. For example, consider an ecommerce site using the explicit list model described herein. If one of the maintainers has updated only a single product or a collection of products in the Database 104, then once the change has been made either the Database 104 or Server 103 can automatically provide the explicit list of changed pages to the Traffic Predictor 106 to build the Manifest 107. As another example, if Caching Layer 102 is removing items from its cache during an eviction or cache flush, it may inform the Traffic Predictor 106 of the explicit list of URLs that were removed so they can be added to Manifest 107.

An example parameter that may be chosen is the prediction model. In some embodiments there may be only a single model available. In other embodiments a developer may combine multiple models.

Example models include an explicit list, statistical frequency, financial model, crawling model, surrogate key model, all pages, real time AI model, different manifest per geographic region, and/or least visited pages.

In the explicit list model, an explicit list of URLs, paths, or headers is provided (e.g., by the developer or maintainer). An example of this in code is shown in FIG. 3.

FIG. 3 shows three explicit requests to be added to the Manifest 107. First the page request at path /p/1 310; second the page request at path /p/2 320 when the cookie value 'lang=en' is present (signifying to the system that this is the English language version of the page); third the page request at path /p/2 330 again but this time when the cookie value 'lang=de' is present (signifying to the system that this is the German language version of the page). The language cookie is just one example of the headers that may be specified. The manifest can and often does contain any of the HTTP headers such as cookies, geographic location, personalization, or segmentation that are used by the Caching Layer 102 as the cache key.

In the statistical frequency model, the Traffic Predictor 106 will analyze the page requests (and associated cache keys) to generate the manifest of requests based purely on their frequency in the site's traffic. For example, the manifest will be a list of URLs starting with the most frequent request first until a specified size limit is reached. An example of this in code is shown in FIG. 4. FIG. 4 shows code for the system to pick the 100 most popular requests in the Access Logs 105 and add them to the manifest.

In the financial model, the Traffic Predictor 106 chooses the requests based on financial metrics such as the revenue or conversion generated by the page. In this case the Traffic Predictor 106 takes Analytics Data 112 as input in addition to the Access Logs 105. Analytics Data 112 such as Google Analytics contains information about the site's users and their behaviors (such as pages visited, ads clicked, or items purchased). The Traffic Predictor 106 picks requests that maximize the revenue potential first. For example, in the case of an ecommerce site, the Traffic Predictor 106 could calculate the revenue of each page as the conversion rate of the product on the page times the cost of the product times the number of page visits to the page, and then pick the pages with the highest result earliest in the manifest.

In the crawling model, the Traffic Predictor 106 uses the link structure relationships between the pages to create a list of requests. For example, the Traffic Predictor 106 may crawl the site starting with the homepage to generate a list of pages. In this case the maintainers would need to specify parameters such as the starting page (e.g., the URL), the crawling algorithm (depth first or breadth first), the maximum crawling depth, the maximum number of crawled pages, pages to avoid (e.g., specified for example by regular expression), additional request metadata (e.g., language or other cookies or headers that affect the cache key), etc.

In the surrogate key model, the Traffic Predictor 106 leverages metadata about the page relationships to the data that has been embedded in the caching parameters. Many modern caching systems support the concept of surrogate keys (sometimes referred to as cache tags) that allow the Server 103 to provide supplemental metadata (often provided via an HTTP header in the response from the Server) that allows the Caching Layer 102 to group together related pages for caching operations. For example, on an ecommerce site, tags may be specified for all the product pages with the surrogate key "product-pages" and the category pages with the surrogate key "category-pages". Now suppose a change has occurred to just the product pages. In this case Caching Layer 102 can flush only the pages that are marked with the "product-pages" tag. The surrogate keys model makes the Traffic Predictor 106 compatible with this surrogate keys capability of some caches. In this model the maintainers specify one or more surrogate keys and another model (such as statistical frequency) which will cause the Traffic Predictor 106 to build a list of the most popular requests from Access Logs 105 that match the provided surrogate keys.

In the all pages model, the Traffic Predictor 106 builds a manifest of all the pages on the site. The list of pages on the site could be supplied through models already discussed such as crawling the site or explicitly by the maintainers. In addition, the Traffic Predictor 106 could get the list of all pages from Server 103 or by querying Database 104. Consider for example an ecommerce site in which the Server 103 could provide a list of all the pages on the ecommerce site, similar to a sitemap that the server will already generate for SEO purposes. Another example, the Traffic Predictor 106 could query the list of categories and products in Database 104 to generate the list of all pages.

In the real time AI model case, the Traffic Predictor 106 analyzes the historical page requests (and associated cache keys), along with other real time metadata such as current time of day, date, weather, or the geographic distribution of requests at the moment the Traffic Predictor 106 is activated. The AI model may be trained on the historical traffic patterns of the site (potentially using Access Logs 105) and using an unsupervised (or clustering) learning algorithm that maps features such as the current traffic of requests, current time of day, date, weather, or the geographic origin of the request into a prediction for the next most likely series of requests. Note this is in some sense the opposite of an anomaly detection ML algorithm, which attempts to detect rare events. Instead, here the ML model is trained to predict what is most likely to happen (i.e., the most common events). These will be combined into an AI model that generates a prediction of the sequence of the most likely pages to be requested at the moment the Traffic Predictor 106 has been activated. For example, if an ecommerce site has a different pattern of product browsed on the weekend versus the rest of the week, then this AI model would alter its manifest to account for that. As another ecommerce example, if the Traffic Predictor 106 has determined a particular page is frequently accessed during a certain time of day (e.g., a site has sales that go live every weekend).

In the geographic model, the Traffic Predictor 106 uses geographic information about the source of the requests (as recorded in the Access Logs 105) to create different manifests for different regions. Consider for example the case where Caching Layer 102 represents a cluster of servers geographically spread out into multiple caches. In this model, the Traffic Predictor 106 would generate a different manifest for each server that prioritizes the most frequent traffic for the caches in that geographic region. Moreover, the Preloader 108 would direct its preloading requests directly to the specific servers in Caching Layer 102 that are part of the geographic region corresponding to that region's manifest. Geographic information in Access Logs 105 may be supplied by the Client Devices (e.g., JavaScript using the standard browser APIs to get the device's latitude and longitude), derived from the IP address (via reverse IP lookup), or recording the cache server that served the request when geographic based DNS resolution is in effect.

In the minimize cache miss model, the Traffic Predictor 106 analyzes the page requests (and associated cache keys) to generate the manifest of requests based purely on their frequency for generating cache misses in the Access Logs 105. This is similar to the statistical model except instead of ranking requests purely by traffic, they are ranked according to the number of cache misses generated.

In the least visited pages model, the Traffic Predictor 106 inverts the logic of the statistical model and prioritizes building infrequently visited pages to minimize the occurrence of cache misses. The motivation is that frequently visited pages are more likely to be "warmed" into the cache by organic traffic and infrequently visited pages are more likely to suffer the performance penalty of a cache miss. Note that there is little benefit in warming a page that will only be requested once or a minuscule number of times so it is natural to set a threshold of minimum traffic that page must have in order to be a candidate for the manifest. In this model, the maintainers could specify a limit on the number of pages in the manifest, a minimum amount of traffic (e.g., percentage of traffic or raw number of visits) for a page to be considered for the manifest, and explicit URLs or URL paths to exclude (e.g., by regular expression) from the manifest. The Traffic Predictor 106 would then use the data in the Access Logs 105 to build a manifest matching the specified criteria.

Another example parameter that may be chosen is the concurrency limit of the Preloader. For example, FIG. 5 shows an example of code for specifying a concurrency limit of the Preloader. In example of FIG. 5, the developer has limited the Preloader to only issuing 10 requests at a time to prevent flooding the server with too many requests.

Note that the Traffic Predictor 106 will use the metadata in the Access Logs 105 to avoid adding requests to the manifest that are not cacheable.

In one embodiment of the invention, operation of the architecture is as follows, (1) Client devices 101 (e.g., laptop, desktop, smartphone, set top box, gaming machine, wearable device, internet of things (iot) device, or other device capable of accessing network resources) visit the site or web application and generate traffic to Caching Layer 102, Server 103, and Database 104. For instance, client devices 101 make HTTP/S requests for resources of the Server 103, and these HTTP/S requests are processed by the Caching Layer 102, Server 103, and Database 104 as previously described.

(2) This traffic results in a recorded history and metadata of the site or web application's traffic that is stored in Access Logs 105.

(3) At some time, a developer or maintainer 109 makes a change to the site or web application, either in the site or web application data in Database 104 or performs a deploy of code to the Server 103.

(4) The deploy process in (3) will trigger some or all the cached content will be flushed (i.e., saved responses removed) by the system once the deploy is complete.

Otherwise, the content in the Caching Layer 102 is potentially out of date and inconsistent with the newly deployed code.

(5) After flushing Caching Layer 102, the deploy process in (3) will send a message to Traffic Predictor 106 that causes it to activate and build a Manifest 107 of page requests. Traffic Predictor 106 can build the manifest in a variety of ways according to parameters specified by the developer as described herein.

(6) The Traffic Predictor 106 passes the Manifest 107 to the Preloader 108. The Preloader 108 begins simulating traffic to the Caching Layer 102 in the order specified in the manifest and according to the concurrency limits specified by the developer. This activity will populate the Caching Layer 102 with the pages in the Manifest.

During step (6), the Preloader 108 may save responses to the simulated requests to additional storage. These rendered page responses are saved in Auxiliary Storage 120 and Caching Layer 102 is informed to use Auxiliary Storage 120 in addition to (or in preference of) Server 103 for cache misses.

(7) Eventually the Preloader 108 completes processing the manifest and the system waits until the next deployment or change.

(8) Note that if a new trigger occurs between steps (4) and (6) during the preloading process, the system may either (a) halt the existing preloading process and start the new one or (b) continue operating and queue the work of the new trigger to occur when the current preloading process finishes.

Note that unlike a static generated site, the deploy in (4) does not wait for a build step. Instead, the system is up and ready to begin serving requests. If a request comes in that is not in the manifest or has not yet been rendered, the server will still be able to respond. If a request does come in for a page that has been rendered, then it can be served from the cache providing the same performance as a statically rendered site. With a properly chosen model (and corresponding manifest), the system will try to maximize the number of pages that have the performance of a statically rendered site while avoiding the impact to team agility that a build step would impose.

Note that unlike SEO prerendering, the rendered pages are intended for all Client Devices 101 and not a just bots and web crawlers (as a result, the rendered page in embodiments is designed to be fully functional, e.g., "React hydrate," when loaded by Client Devices 101 whereas for SEO prerendering hydration is not needed nor typically done); a headless browser is not required; and some of the pages are rendered ahead of time instead of when a bot or crawler sends the request to the Caching Layer 102.

Figure 6A:
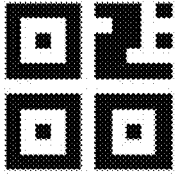
FIG. 6A shows a first portion of an embodiment of a GUI that indicates the progress of the preloader that may be used in some embodiments.
Figure 6B:
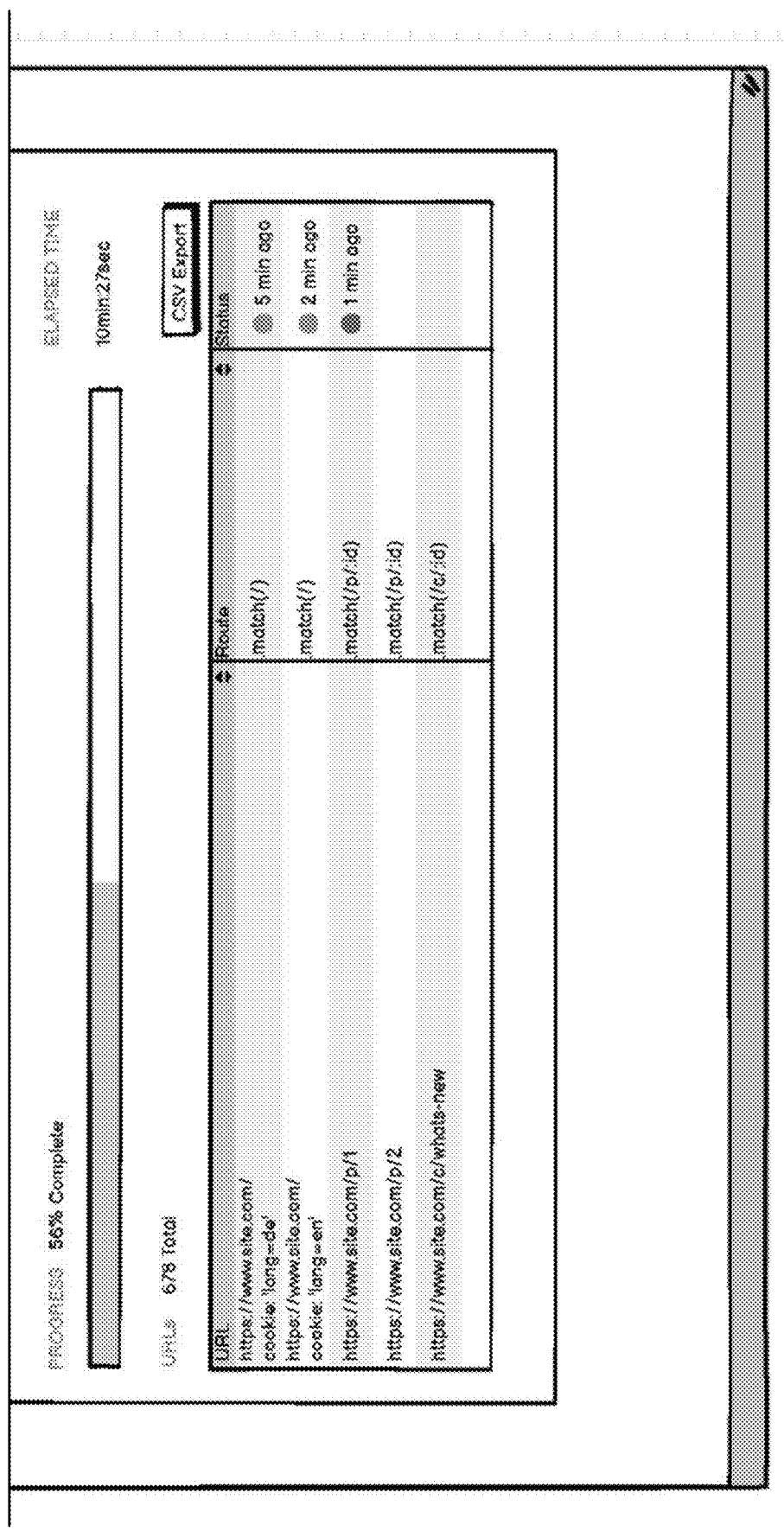
FIG. 6B shows a second portion of the embodiment of the GUI that indicates the progress of the preloader that may be used in some embodiments.

Between steps (4) and (7), the system may provide a GUI that indicates the progress of the Preloader 108. An example GUI is shown in FIG. 6. As shown in the FIG. 6, the GUI displays the status of the preloading (e.g., starting, in progress, complete), the list of each request in Manifest 107 and its preloading status, the total time taken by the preloading process so far, and it's estimated completion time.

The embodiment previously described waits until it is triggered by a deploy or change of the site or web application's data in step (3). Alternative embodiments may add or replace step (3) with a variety of possible other triggers including but not limited to:

a. Manual trigger: Maintainers 109 issue an API call or use a button in the GUI to trigger the preloading process.

b. Scheduled trigger: Maintainers 109 use an API or GUI to schedule the preloading process at a specified date, time, or periodic interval.

c. API trigger: The preloading process is triggered by an API call from a third-party system such as an ecommerce platform or CMS or perhaps by Server 103 itself d. Cache flush trigger: The preloading process is triggered by the action of flushing or evicting some or all the cached responses in Caching Layer 102.

Finally, in some embodiments, the preloading process is always triggered and in effect constantly analyzing traffic in Access Logs 105 and turning them Manifests 107 in real time as traffic arrives.

Figure 7A:
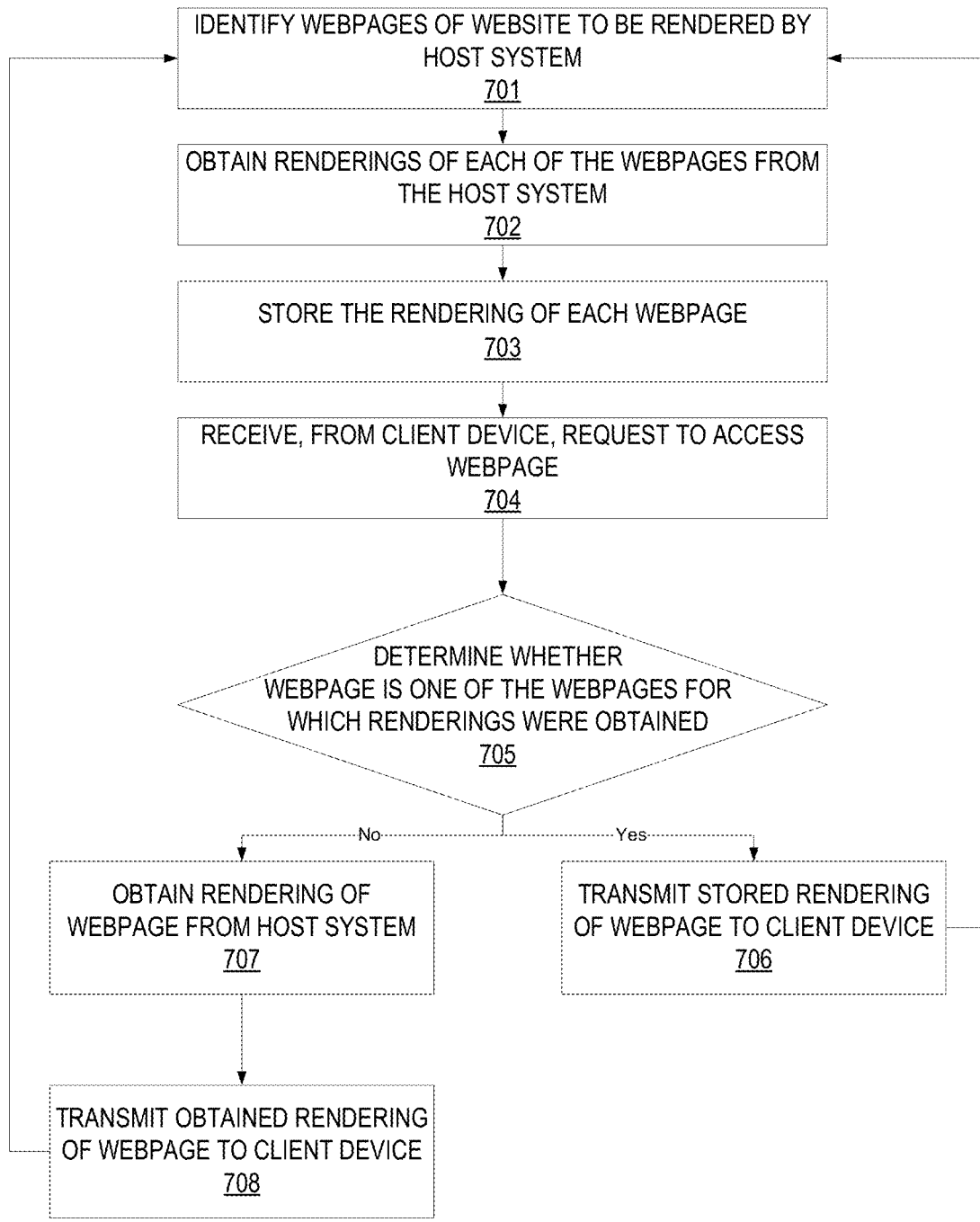
FIG. 7A is a flow diagram that illustrates an example process for providing content of webpages of a website to a client device according to some embodiments.

FIG. 7A is a flow diagram that illustrates an example process for providing content of webpages of a website to a client device according to some embodiments. The operations of FIG. 7A may be performed by the content delivery system 110 described herein with reference to FIGS. 1A-1B. In some embodiments, the operations of FIG. 7A may be performed by systems other than the content delivery system 110. For example, the operations of FIG. 7A may be performed by any suitable computer system.

At operation 701, the system identifies multiple webpages, from among all the webpages of a website, to be rendered by a host system (e.g., host system 130). The system may be configured to identify the webpages using various techniques described herein. The operation 701 may be initiated in response to one or more triggers described herein. The operation 701 may be performed prior to and/or independent of receiving any request from client devices to access webpage(s) of the website. In some embodiments, the operation 701 may be performed by the system while the system is responding to request(s) to access webpage(s) of the website.

At operation 702, the system obtains renderings of each of the webpages identified in operation 701 from the host system. The system may be configured to transmit requests to the host system to render the webpages. The system may be configured to generate the requests using information about webpages of the website stored on the system. In some embodiments, the system may be configured to include, in the requests, parameter values indicating content of the webpages. The parameter values may be used by the host system in determining content for the webpages. For example, the system may include parameter values in a header, URL, and/or cookie that may be used by the host system to render the webpages (e.g., by including content specified by the parameters in the webpages). The parameter values may indicate variations in renderings of webpages of the website (e.g., in terms of language, format, visual theme, and/or other content). The system may be configured to receive the renderings of each webpage in response to the requests. For example, the system may receive rendered webpage files (e.g., HTML files) from the host system. The renderings of each webpage may be in accordance with parameter values specified in requests. For example, the rendering of each webpage may include textual information in a language specified by a language parameter.

In some embodiments, the system may be configured to obtain the renderings of the webpages identified in operation 701 while also obtaining renderings of other webpage(s). For example, the system may obtain the renderings of the webpages identified in operation 701 while also (e.g., simultaneously) obtaining renderings for webpage(s) that have been requested by the client device(s). The host system may thus perform rendering for the webpages identified in operation 701 while performing rendering for other webpage(s)

(e.g., to respond to requests from client devices). In some embodiments, the system may be configured to limit a number of renderings to request from the host system as part of operation 702, to obtain the total amount of renderings identified in operation 701. The system may include a concurrency limit parameter specifying a maximum number of requests to issue to the host system (e.g., to prevent flooding of the host system) as described herein with reference to FIG. 5. This may ensure that the host system has sufficient processing capacity to respond to other requests. In some embodiments, the system may receive such requests that are to be served by the host system and passes those requests to the host system as the system receives them from the client device(s). The system may, in some such embodiments, be configured to prioritize these requests for the host system. For example, the system may prioritize transmitting to a host system a request for a rendering of a webpage to respond to a client device over requests for renderings of webpages that are being preloaded prior to receiving a request from a client device. In another example, the system may prioritize requests for renderings of webpages that are more frequently accessed over requests for renderings of webpages that are less frequently accessed, or otherwise prioritize requests.

At operation 703, the system may store the rendering of each webpage obtained from the host system in operation 702. For example, the system may store rendered webpage files obtained from the host system in storage hardware of the system (e.g., in storage of content delivery system data centers). In some embodiments, the system may be configured to store information for use in determining whether a webpage requested by a client device is one for which the system has previously obtained a rendering (e.g., as described in operation 705). The information for each rendering of a webpage may include a cache key comprising a URL along with header and cookie values, and/or other information associated with the rendering of the webpage. The system may be configured to generate a cache key for each of the renderings of webpages using information about the webpages of the website. As an illustrative example, a cache key for renderings of webpages may include: (1) a value of a language header indicating a language of textual content in the renderings; (2) a value of a user agent header; (3) a value of a referrer header; and/or (4) other header values.

At operation 704, the system receives a request from a client device to access a webpage of the website. For example, the request may be an HTTP request indicating the webpage requested by the client device. The request from the client device may include values of one or more parameters that indicate content in the webpage. For example, the request may include a language parameter indicating the language for textual information displayed on the webpage. In another example, the request may include a parameter indicating a title to be displayed on the webpage.

At operation 705, the system determines whether the requested webpage is one of the webpages for which renderings were obtained in operation 702. The system may be configured to determine if a rendering of the webpage is stored on the system. In some embodiments, the system may be configured to determine whether the rendering of the webpage is stored on the system by determining whether parameter(s) in the request from the client device meet one or more criteria for the parameter(s) associated with stored renderings of webpages. The system may compare parameter values in a request to those associated with webpages for which the system has previously obtained renderings to determine whether the parameter(s) meet the criteria. In some embodiments, the criteria may be encoded by a user (e.g., a developer).

In some embodiments, the system may be configured to determine whether a rendering has been obtained for the requested webpage using information characterizing webpages, such as cache keys that are associated with stored renderings of webpages and associated with webpages being requested. In embodiments that use cache keys, the system may use the cache keys to determine whether any of the webpages for which renderings are stored would match the requested webpage. In some embodiments, the system may be configured to determine whether the requested webpage is one of the webpages for which renderings were obtained in operation 702 by comparing parameter values for the requested webpages to parameter values associated with stored rendering of webpages. These parameter values may be compared by determining cache keys based on the parameters and then comparing the cache keys. When cache keys are used, or when other forms of parameter comparison are used to identify correspondences between stored renderings and incoming webpage requests, information about the website and/or the webpages of the website may be used to identify a subset of parameters that are used in the cache key determination or otherwise used in the comparison. Such information about the webpages and/or website may include information that indicates which parameters affect content of a webpage of that website and which do not, or otherwise indicate which parameters are more relevant to a particular website. This information may be input to the system by a user who may be a developer of the website, an administrator of the website, and/or an administrator to another system, such as when the system is configured to service requests for webpages of the website hosted by the host system and/or when the system is configured to identify and obtain renderings.

As another example, the system may compare parameters and webpages to identify what parameters cause variation in webpage content and which do not. In some such embodiments, the system may determine hash values for webpage content associated with different parameter(s) and use the hash values to determine the parameters that drive differences in content. As an illustrative example, one of the parameters in a request from a client device may be a language parameter, which may in some cases take a value of "English-US" and in others "English-UK". In this example, the system may determine whether the "English-US" and "English-UK" values meet criteria associated with stored renderings of webpages to determine whether the parameter is one that is meaningful for any webpages of the website, in that the parameter drives different content. To illustrate, a website's "About Us" webpage may include the same content for both the "English-US" and "English-UK" values. By contrast, a product information webpage may display different information for the "English-US" version than for the "English-UK" version (e.g., different currency, shipping times, shipping costs, taxes, and/or other information). If associated with different content, incoming requests with different parameter values should be treated differently. The system may be configured to calculate hash values on webpages that are associated with the "English-US" and with the "English-UK" parameter values to determine whether they differ. If not, the system may learn there is a common rendering of the requested webpages for all language parameters including a value of "English," such as for "English-US" and "English-UK". Accordingly, if the system has stored a rendering of a webpage associated with the parameter "English-UK," the system may match an incoming request with a parameter "English-US" to that rendering. As another example, the system may match a URL of a request webpage to all, or a portion of a URL associated with a stored rendering of a webpage.

If at operation 705 the system determines that the system has a rendering of the requested webpage stored on the system, then the system performs operation 706, in which the system transmits the stored rendering to the client device. The system does not need to obtain a rendering of the requested webpage as it was previously obtained in operation 702. The system may be configured to access the stored rendering from data storage (e.g., storage 110A) of the system.

If at operation 705 the system determines that the system does not have a rendering of the requested webpage stored on the system, then the system performs operation 707, in which the system obtains a rendering of the requested webpage from the host system. The system may transmit a request to the host system that causes the host system to provide a rendering of the requested webpage. In operation 708, the system transmits the rendering of the requested webpage obtained from the host system to the client device.

In some embodiments, the system may be configured to further store the rendering of the requested webpage in storage of the system (e.g., storage 110A), even if it was not identified in operation 701. The system may determine whether to store the rendering of the requested webpage. The determination may be separate from the identification of webpages performed in operation 701. In some embodiments, the system may determine to store the rendering based on a caching configuration specified by a user (e.g., a developer of the website and/or an administrator). The caching configuration may specify one or more criteria. In some embodiments, the criteria may include criteria for content of the URL of the requested webpage, header(s) for the requested webpage, cookie(s) for the requested webpage, and/or content returned within the webpage. In such embodiments, the system may determine whether the criteria are met by matching content (e.g., of the URL, header(s), cookie(s), and/or content returned withing the webpage) to one or more target values (e.g., target string(s)). Matching of content may be performed using simple string matching, glob matching, regular expression matching, and/or other type of matching. To perform matching on content within the webpage, the system may parse the content of the webpage (e.g., HTML and/or JSON) and match specific value(s) in the parsed content. When the system determines that the criteria is met (e.g., using a cache key generated for the requested webpage), the system may store the rendering of the requested webpage. To illustrate, a website's product information webpages may each have a corresponding URL that includes a URL of the form "/product/X", where the "X" is replaced with a product identification of a particular product. The caching configuration may specify that renderings for all webpages that have a URL including the string "/product/" are to be stored, even if one or more of the webpages were not identified in operation 701. With the caching configuration of this example, the system may store renderings of all product information webpages.

In some embodiments, the system may determine to store the rendering based on caching instructions (e.g., cache control headers) encoded in a response received from the host system. For example, the host system may include a cache-control header in a response which causes the system to store the rendering of the webpage received from the host system. In such embodiments, the host system may be configured to include caching instructions in the response based on one or more criteria. The host system may evaluate such criteria when responding to a request for a webpage and transmitting a rendering of the webpage in response to the request. When the host system determines that the criteria are met, the host system may include, in the response, instructions to cache the rendering. The host system is not limited to using any particular criteria and may evaluate criteria that include, for example, caching criteria described above (e.g., based on URL, header(s), and/or cookie(s), as discussed immediately above), criteria related to a number of times a request for the webpage has been received (e.g., as in other caching determinations set out herein), or other criteria. The system may be configured to transmit the stored rendering of the webpage in response to a subsequent request for the webpage (e.g., as performed in operation 706).

As shown in FIG. 7A, after transmission of the rendering of the requested webpage to the client device in operation 706 or 708, the system may perform operation 701 again. The system may perform operation 701 in response to a trigger after performing operation 706 or 708.

Figure 7B:
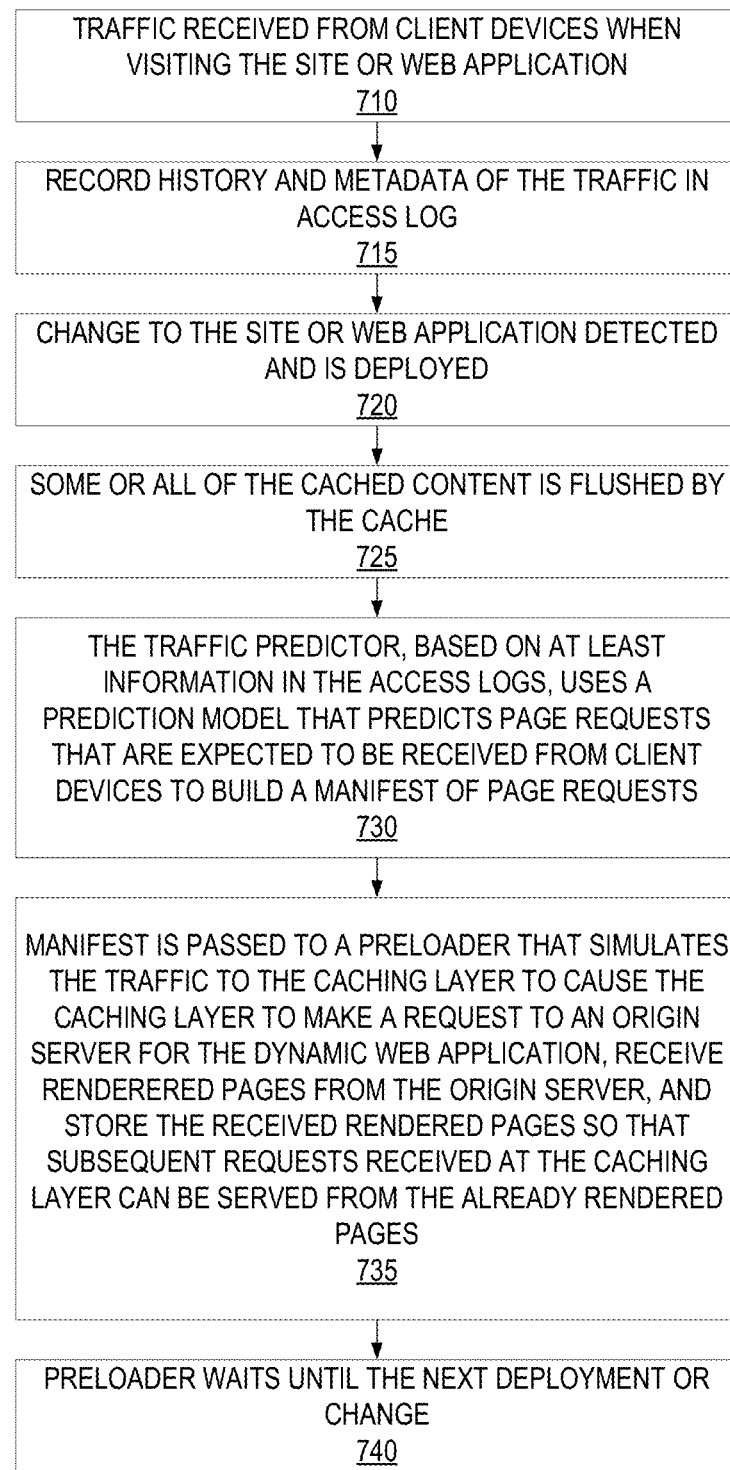
FIG. 7B is a flow diagram that illustrates exemplary operations for intelligent dynamic preloading according to an embodiment.

FIG. 7B is a flow diagram that illustrates exemplary operations for intelligent dynamic preloading according to an embodiment. The operations of FIG. 7B are described with reference to the exemplary embodiment of FIGS. 1A-1B. However, the operations of FIG. 7B can be performed by embodiments other than those discussed with reference to FIGS. 1A-1B, and the embodiments discussed with reference to FIGS. 1A-1B can perform operations different than those discussed with reference to FIG. 7B.

At operation 710, traffic is received from client devices 101 at the Caching Layer 102, Server 103, and Database 104 when the client devices are visiting a site or web application. This traffic may be HTTP/S requests. Next, at operation 715, history and metadata of the traffic is stored in the Access Logs 105. For instance, the Caching Layer 102 may log the request URL, cookies, and/or other parameters related to the request and/or response (e.g., status code, headers, etc.) in the Access logs 105, as previously described herein.

Next, at operation 720, a change to the site or web application is detected and the site or web application is deployed. For example, the Maintainer of the site or web application may create a new page for the site or web application, modify an existing page for the site or web application, delete an existing page for the site or web application, add content to the database for the site or web application, modify content in the database for the site or web application, and/or delete content from the database for the site or web application. Next, at operation 725, as a result of the change in operation 720, some or all of the cached content for the site or web application is flushed by the Caching Layer 102.

Next, at operation 730, the Traffic Predictor 106, based on at least the information in the access logs 105, uses a prediction model that predicts page requests that are expected to be received from client devices to build a manifest of page requests. The prediction model(s) that can be used are previously described herein. Next, at operation 735, the Traffic Predictor 106 passes the generated manifest 107 to the Preloader 108 and the Preloader 108 begins simulating traffic to the Caching Layer 102. Thus, the Preloader 108 begins making requests to the Caching Layer 102 (e.g., HTTP/S requests) for the page requests specified in the manifest, and optionally in the order specified in the manifest. The requests cause the Caching Layer 102 to make corresponding requests to the origin server 103 for the site or web application, receive rendered pages from the origin server 103 (which may include the origin server interacting with the Database 104), and store the received rendered pages so that subsequent requests from client devices received at the Caching Layer 102 can be served from the already rendered pages in the cache. Next, at operation 740, the Preloader 104 waits until the next deployment or change.

Although FIG. 7B described an embodiment where the traffic predictor waits until it is triggered by a deploy or change of the site or web application data, the traffic predictor may be triggered differently in different embodiments. For example, the Traffic Predictor 106 may be triggered by receiving a manual trigger from the Maintainers 109 such as through issuing an API call or using a button in the GUI to trigger the preloading process. As another example, the Traffic Predictor 106 may be triggered on a schedule set by the Maintainers 109 such as through issuing an API call or using a GUI to schedule the preloading process at a specified date, time, or periodic interval. As another example, the Traffic Predictor 106 may be triggered through an API call from a third-party system such as an ecommerce platform or CMS or perhaps by Server 103 itself. As another example, the Traffic Predictor 106 may be triggered by a cache flush trigger such as the action of flushing or evicting some or all of the cached responses in Caching Layer 102.

Figure 8:
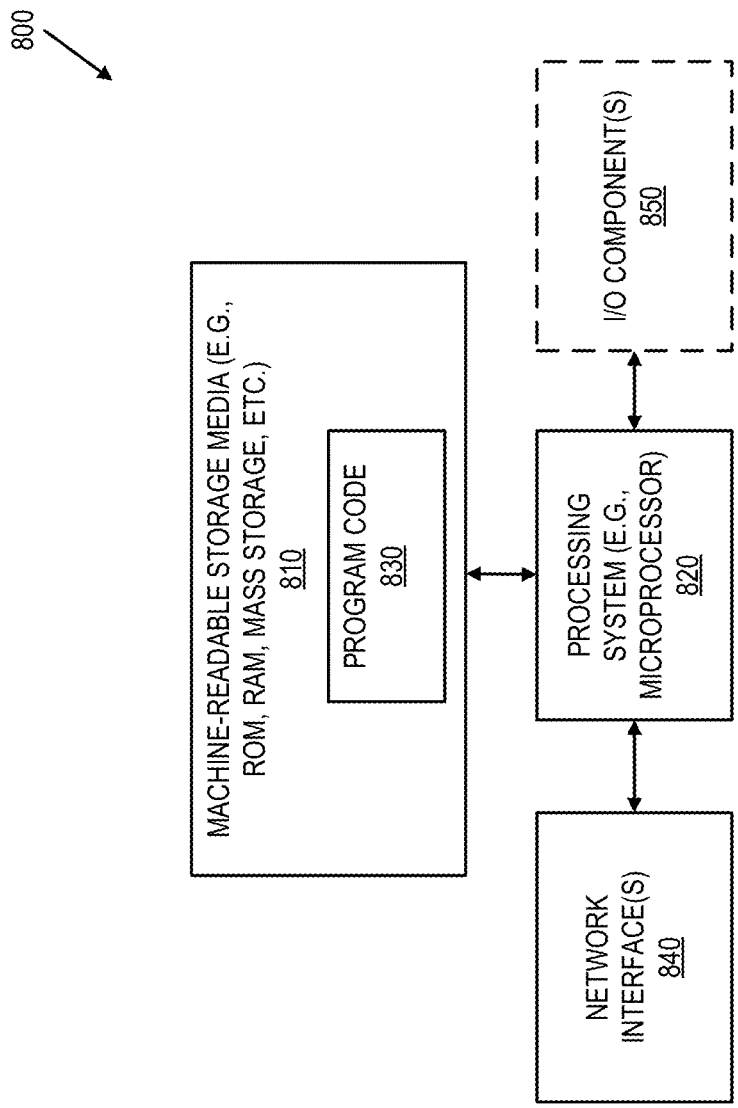
FIG. 8 illustrates a block diagram for an exemplary data processing system that may be used in some embodiments.

FIG. 8 illustrates a block diagram for an exemplary data processing system 800 that may be used in some embodiments. One or more such data processing systems 800 may be used to implement the embodiments and operations described with respect to the preloader, caching layer, server, auxiliary storage, or other computing devices. The data processing system 800 is a computing device that stores and transmits (internally and/or with other computing devices over a network) code (which is composed of software instructions and which is sometimes referred to as computer program code or a computer program) and/or data using machine-readable media (also called computer-readable media), such as machine-readable storage media 810 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 820 (e.g., one or more processors and connected system components such as multiple connected chips). For example, the depicted machine-readable storage media 810 may store program code 830 that, when executed by the processor(s) 820, causes the data processing system 800 to perform any of the operations described herein such as the operations performed by the preloader, the caching layer, and/or the server.

The data processing system 800 also includes one or more network interfaces 840 (e.g., a wired and/or wireless interfaces) that allows the data processing system 800 to transmit data and receive data from other computing devices, typically across one or more networks (e.g., Local Area Networks (LANs), the Internet, etc.). The data processing system 800 may also include one or more input or output ("I/O") components 850 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 800, and, in certain embodiments, fewer components than that shown in One or more buses may be used to interconnect the various components shown in FIG. 8.

The techniques shown in the figures can be implemented using code and data stored and executed on one or more electronic devices (e.g., client device, preloader, caching layer, server, database, auxiliary storage). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth to provide a more thorough understanding of embodiments. It will be appreciated, however, by one skilled in the art that the embodiments may be practiced without such specific details. In other instances, full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A system for delivering content of one or more webpages from a host system to client devices, the system configured to communicate with the client devices and the host system, the system comprising:
    at least one processor; and
    at least one non-transitory computer-readable storage medium having encoded thereon:
        information about webpages provided by the host system; and
        instructions that, when executed by the at least one processor, cause the at least one processor to perform a method comprising:
            identifying, using the information about the webpages, a plurality of webpages, of the webpages provided by the host system, to be rendered by the host system, wherein identifying the plurality of webpages to be rendered by the host system comprises using a prediction model to generate one or more predictions of future webpage requests based on one or more prior requests to access the webpages;
            obtaining, from the host system, a rendering of each of the plurality of webpages;
            storing the rendering of each of the plurality of webpages in the at least one non-transitory computer-readable storage medium;
            receiving, from a client device, a request to access a first webpage of the webpages;
            determining, using the information about the webpages, whether the first webpage identified in the request is included in the plurality of webpages for which renderings were obtained; and
            in response to determining that the first webpage is included in the plurality of webpages for which renderings were obtained, transmitting, to the client device, a rendering of the first webpage stored in the at least one non-transitory computer-readable storage medium.

2. The system of claim 1, wherein the method further comprises triggering identifying of the plurality of webpages in response to a notification of a deployment of a website and/or web application on the host system.

3. The system of claim 1, wherein the method further comprises triggering identifying of the plurality of webpages in response to updating of one or more of the webpages.

4. The system of claim 1, wherein the method further comprises triggering the identifying, using the information about the webpages, the plurality of webpages in response to removal of renderings of at least some webpages from the at least one non-transitory computer-readable storage medium.

5. The system of claim 1, wherein the identifying, using the information about the webpages, the plurality of webpages to be rendered by the host system is not triggered by a request from the client device for a webpage of the plurality of webpages.

6. The system of claim 1, wherein the information about the webpages comprises information about one or more parameters that are used by the host system to render the webpages.

7. The system of claim 6, wherein obtaining the rendering of each of the plurality of webpages comprises:
    determining values of the one or more parameters that, when used by the host system, cause the host system to render one of a plurality of versions of the webpage; and
    transmitting, to the host system, a request including the determined values of the one or more parameters.

8. The system of claim 7, wherein:
    the request comprises a URL, a cookie, and/or a header; and
    transmitting the request including the determined values of the one or more parameters comprises including the determined values of the one or more parameters in the URL and/or the cookie.

9. The system of claim 6, wherein obtaining the rendering of each of the plurality of webpages comprises:
    transmitting, to the host system, a request with a first set of values of the one or more parameters indicating first content to be rendered for a first webpage of the plurality of webpages;
    obtaining, from the host system, a rendering of the first webpage including the first content;
    transmitting, to the host system, a request with a second set of values of the one or more parameters indicating second content to be rendered for a second webpage of the plurality webpages; and
    obtaining, from the host system, a rendering of the second webpage including the second content.

10. The system of claim 1, wherein the method further comprises:
    receiving, from the client device, a request to access a second webpage of the webpages provided by the host system; and
    in response to determining that the second webpage is not included in the plurality of webpages for which renderings were obtained,
        obtaining, from the host system, a rendering of the second webpage; and
        transmitting the rendering of the second webpage to the client device.

11. The system of claim 1, wherein identifying, using the information about the webpages, the plurality of webpages to be rendered by the host system comprises:
    determining most accessed webpages of the webpages provided by the host system; and
    identifying the most accessed webpages as among the plurality of webpages to be rendered.

12. The system of claim 10, wherein:
    the information about the webpages comprises access logs for the webpages; and
    identifying the plurality of webpages to be rendered by the host system comprises using the access logs to identify the plurality of webpages.

13. The system of claim 1, wherein identifying, using the information about the webpages, the plurality of webpages to be rendered by the host system comprises:
    determining least accessed webpages of the webpages; and identifying the least accessed webpages as among the plurality of webpages to be rendered.

14. The system of claim 1, wherein the prediction model comprises a statistical model indicating a frequency of the one or more prior requests to access of the webpages.

15. The system of claim 14, wherein identifying the plurality of webpages to be rendered by the host system using the prediction model comprises determining that the prediction model indicates that the plurality of webpages are accessed more frequently than other ones of the webpages.

16. The system of claim 14, wherein identifying the plurality of webpages to be rendered by the host system using the prediction model comprises determining that the prediction model indicates that the plurality of webpages are accessed less frequently than other ones of the webpages.

17. At least one non-transitory computer-readable storage medium having encoded thereon information about webpages provided by a host system and instructions that, when executed by at least one processor, cause the at least one processor to perform a method for delivering content of one or more webpages provided by a host system to client devices, the at least one processor configured to communicate with the client devices and the host system, the method comprising:
    identifying, using the information about the webpages, a plurality of webpages, of the webpages provided by the host system, to be rendered by the host system, wherein identifying the plurality of webpages to be rendered by the host system comprises using a prediction model to generate one or more predictions of future webpage requests based on one or more prior requests to access the webpages;
    obtaining, from the host system, a rendering of each of the plurality of webpages;
    storing the rendering of each of the plurality of webpages in the at least one non-transitory computer-readable storage medium;
    receiving, from a client device, a request to access a first webpage of the webpages;
    determining, using the information about the webpages, whether the first webpage identified in the request is included in the plurality of webpages for which renderings were obtained; and
    in response to determining that the first webpage is included in the plurality of webpages for which renderings were obtained, transmitting, to the client device, a rendering of the first webpage stored in the at least one non-transitory computer-readable storage medium.

18. The at least one non-transitory computer-readable storage medium of claim 17, wherein the method further comprises triggering identifying of the plurality of webpages in response to a notification of a deployment of a website and/or web application on the host system.

19. A method for a system to deliver content of one or more webpages provided by a host system to client devices, the system configured to communicate with the client devices and the host system, the method comprising:
    identifying, using information about the webpages stored by the system, a plurality of webpages, of the webpages provided by the host system, to be rendered by the host system, wherein identifying the plurality of webpages to be rendered by the host system comprises using a prediction model to generate one or more predictions of future webpage requests based on one or more prior requests to access the webpages;
    obtaining, from the host system, a rendering of each of the plurality of webpages;
    storing the rendering of each of the plurality of webpages in at least one non-transitory computer-readable storage medium;
    receiving, from the client device, a request to access a first webpage of the webpages;
    determining, using the information about the webpages, whether the first webpage identified in the request is included in the plurality of webpages for which renderings were obtained; and
    in response to determining that the first webpage is included in the plurality of webpages for which renderings were obtained, transmitting, to the client device, a rendering of the first webpage stored in the at least one computer-readable storage medium.

20. The system of claim 1, wherein:
the prediction model comprises a model based on a frequency of cache misses associated with the one or more prior requests to access the webpages; and
using the prediction model to generate the one or more predictions of future webpage requests comprises using the model based on the frequency of cache misses to predict future webpage requests that would generate cache misses.

* * * * *